US012169750B2

(12) United States Patent
Goodchild

(10) Patent No.: US 12,169,750 B2
(45) Date of Patent: Dec. 17, 2024

(54) RADIO FREQUENCY IDENTIFICATION FOR MULTI-DEVICE WIRELESS CHARGERS

(71) Applicant: AIRA, INC., Chandler, AZ (US)

(72) Inventor: Eric Heindel Goodchild, Phoenix, AZ (US)

(73) Assignee: AIRA, INC., Phoenix, AZ (US)

( * ) Notice: Subject to any disclaimer, the term of this patent is extended or adjusted under 35 U.S.C. 154(b) by 476 days.

(21) Appl. No.: 17/400,043

(22) Filed: Aug. 11, 2021

(65) Prior Publication Data
US 2022/0051065 A1 Feb. 17, 2022

Related U.S. Application Data

(60) Provisional application No. 63/065,465, filed on Aug. 13, 2020.

(51) Int. Cl.
*H02J 50/12* (2016.01)
*G06K 19/07* (2006.01)
*H02J 50/80* (2016.01)
*H02J 50/90* (2016.01)

(52) U.S. Cl.
CPC .......... *G06K 19/0723* (2013.01); *H02J 50/12* (2016.02); *H02J 50/80* (2016.02); *H02J 50/90* (2016.02)

(58) Field of Classification Search
CPC ...... G06K 19/0723; H02J 50/12; H02J 50/80; H02J 50/90
See application file for complete search history.

(56) References Cited

U.S. PATENT DOCUMENTS 11,171,502 B2 * 11/2021 Goodchild ............ H02J 7/0045
2012/0248891 A1 10/2012 Drennen
2013/0154560 A1 6/2013 Walley et al.
(Continued)

FOREIGN PATENT DOCUMENTS

WO 20200110761 A1 6/2020

OTHER PUBLICATIONS

PCT/US2021/045809. International Search Report & Written Opinion date Nov. 23, 2021. (11 pages).
(Continued)

*Primary Examiner* — Nghia M Doan
(74) *Attorney, Agent, or Firm* — LOZA & LOZA LLP; Anthony Smyth

(57) ABSTRACT

Systems, methods and apparatus for wireless charging are disclosed. A charging device has multiple transmitting coils, a driver circuit configured to provide a charging current to the resonant circuit, and a controller. The charging cells may provide a charging surface. The driver circuit may be configured to provide a charging current to the transmitting coils. The charging device includes a radio interface configured for transmitting and receiving radio frequency identification (RFID) signals. The controller may be configured to transmit an interrogation signal configured to stimulate RFID tags through the radio interface when a chargeable device is initially placed on or near a surface of the wireless charger, refrain from initiating wireless charging of a chargeable device when a response to the interrogation signal is received, and negotiate a charging configuration when a response to the interrogation signal is not received.

13 Claims, 14 Drawing Sheets

(56) References Cited

U.S. PATENT DOCUMENTS

| | | |
|---|---|---|
| 2014/0266025 A1 | 9/2014 | Jakubowski |
| 2014/0285141 A1 | 9/2014 | Lee et al. |
| 2014/0319926 A1* | 10/2014 | Jung .................. H02J 50/12 |
| | | 307/104 |
| 2016/0315506 A1 | 10/2016 | John et al. |
| 2017/0201003 A1* | 7/2017 | Ackley ................ H02J 7/0068 |
| 2019/0267828 A1 | 8/2019 | Goodchild et al. |
| 2019/0305826 A1 | 10/2019 | Park |
| 2019/0386522 A1* | 12/2019 | Park .................... H02J 50/60 |
| 2020/0169862 A1 | 5/2020 | Moritomo |
| 2020/0403456 A1* | 12/2020 | Louis .................... H02J 50/10 |

OTHER PUBLICATIONS

Extended European Search Report dated Aug. 20, 2024 for Application No. 21856746.9, 6 pages.

\* cited by examiner

RADIO FREQUENCY IDENTIFICATION FOR MULTI-DEVICE WIRELESS CHARGERS

PRIORITY CLAIM

This application claims priority to and the benefit of provisional patent application No. 63/065,465 filed in the United States Patent Office on Aug. 13, 2020, and the entire content of this application is incorporated herein by reference as if fully set forth below in their entirety and for all applicable purposes.

TECHNICAL FIELD

The present invention relates generally to wireless charging of batteries, including batteries in mobile computing devices, and more particularly to demodulating signals received from a device being charged during a charging operation.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for techniques for avoiding collateral damage to devices that may be uninvolved in a wireless charging transaction.

DETAILED DESCRIPTION

Figure 1:
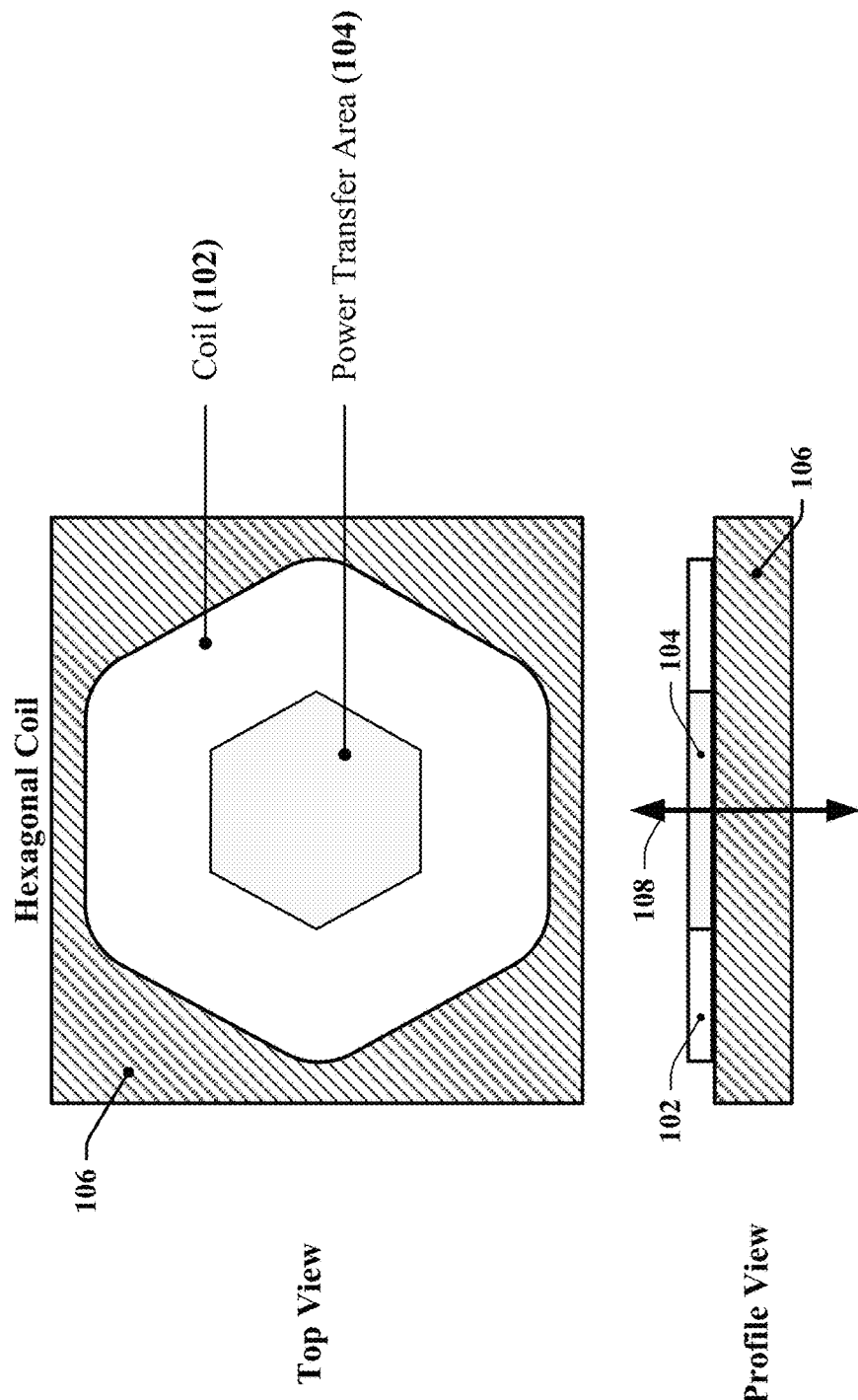
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface in a charging device where the charging surface enables the charging device to charge one or more chargeable devices wirelessly. The location of a device to be charged may be detected through sensing techniques that associate location of the device to changes in a physical characteristic centered at a known location on the charging surface. Sensing of location may be implemented using capacitive, resistive, inductive, touch, pressure, load, strain, and/or another appropriate type of sensing.

In one aspect of the disclosure, an apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to the charging surface of the charging device without overlap of power transfer areas of the charging cells in the plurality of charging cells. Devices placed on the surface may receive power that is wirelessly transmitted through one or more of the charging cells.

In some instances, the apparatus may also be referred to as a charging surface. Power can be wirelessly transferred to a receiving device located anywhere on a surface of the apparatus. The receiving devices can have an arbitrarily defined size and/or shape and may be placed without regard to any discrete placement locations enabled for charging. Multiple receiving devices can be simultaneously charged on a single charging surface. The apparatus can track motion of one or more receiving devices across the charging surface.

Certain aspects disclosed herein relate to the detection of RFID tags, contactless credit cards and other objects equipped with circuits that respond to near-field communication (NFC) signals and that may be attached to, or collocated with a chargeable device that is placed on or near a charging surface of a charging device. The charging device may have multiple transmitting coils, a driver circuit configured to provide a charging current to the resonant circuit, and a controller. The charging cells may provide the charging surface. The driver circuit may be configured to provide a charging current to the transmitting coils. The charging device includes a radio interface configured for transmitting and receiving RFID signals or other NFC signals. In one example, the controller may be configured to transmit an interrogation signal configured to stimulate RFID tags through the radio interface when a chargeable device is initially placed on or near a surface of the wireless charger, refrain from initiating wireless charging of a chargeable device when a response to the interrogation signal is received, and negotiate a charging configuration when a response to the interrogation signal is not received. Negotiating a charging configuration precedes charging. In one example, the charging device transmits a wireless ping to confirm presence of a chargeable device and to determine a charging configuration defining transmitting coils to be used for charging and level of charging current.

In some implementations, the wireless charger transmits an interrogation signal and may refrain from transmitting a ping if a response to the interrogation signal indicates presence of an RFID tag or other RFID-equipped item associated with the chargeable device. In some implementations, the chargeable device transmits the interrogation signal and may refrain from responding to a ping if a response to the interrogation signal indicates presence of an RFID tag or RFID-equipped item associated with the chargeable device. The chargeable device may alternatively respond to the ping when an RFID tag or RFID-equipped item is present by sending a message to the wireless charger declining charging.

Charging Cells

According to certain aspects disclosed herein, a charging surface may be provided using charging cells in a charging device, where the charging cells are deployed adjacent to the charging surface. In one example the charging cells are deployed in one or more layers of the charging surface in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell and directed along or proximate to a common axis. In some examples, the coils in a charging cell are formed using traces on a printed circuit board. In some examples, a coil in a charging cell is formed by spirally winding a wire to obtain a planar coil or a coil that has a generally cylindrical outline. In one example, Litz wire may be used to form a planar or substantially flat winding that provides a coil with a central power transfer area.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal portion of the charging surface associated with the charging cell. In some implementations, charging cells may be configurable by providing an activating current to coils that are included in a dynamically-defined charging cell. For example, a charging device may include multiple stacks of coils deployed across the charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. As described herein, the charging surface may include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that encloses one or more coils 102, which may be constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
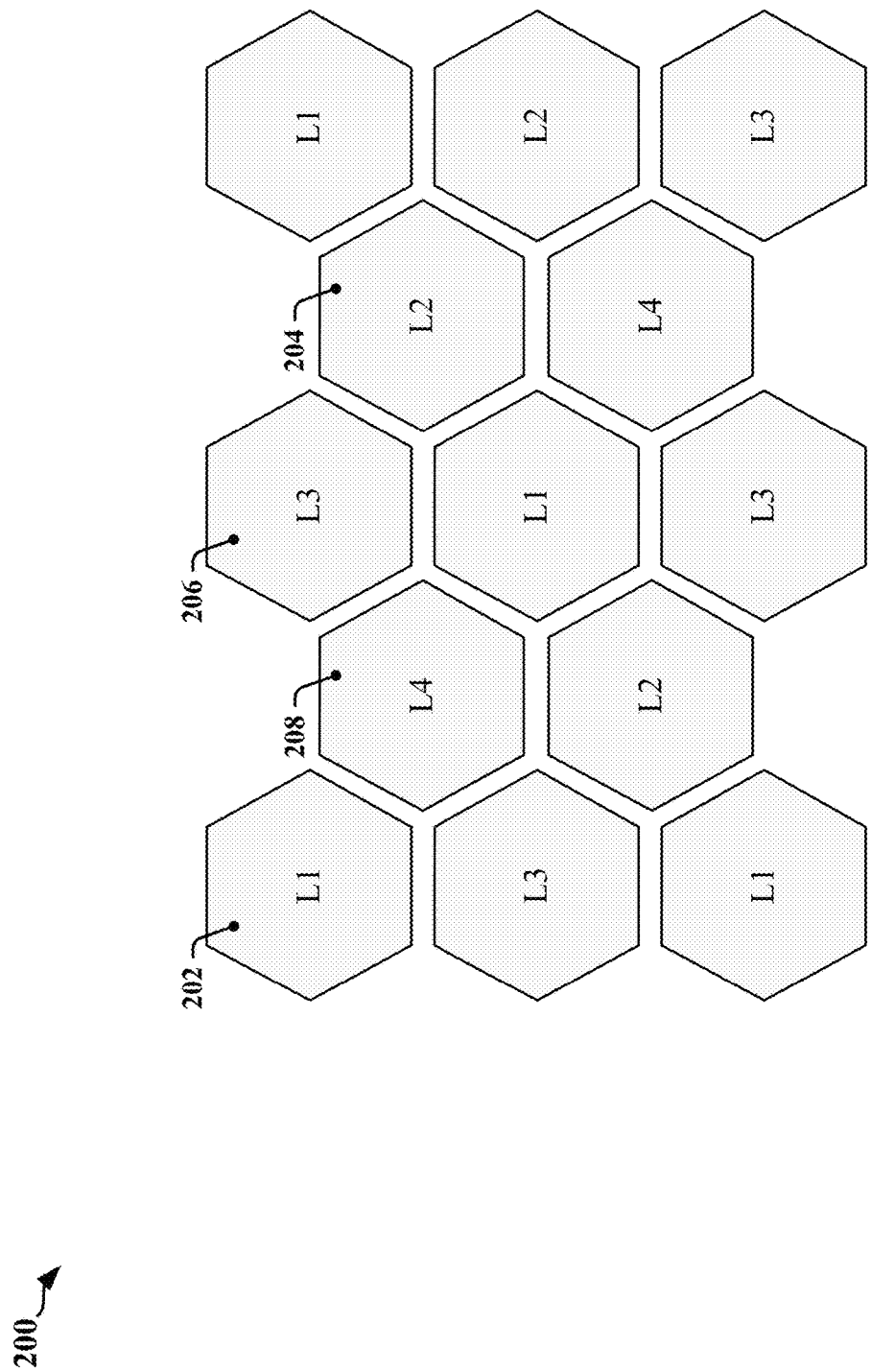
FIG. 2 illustrates the arrangement of power transfer areas provided by a charging surface that employs multiple layers of charging cells configured in accordance with certain aspects disclosed herein.

FIG. 2 illustrates the arrangement of power transfer areas provided across a surface 200 of a charging device that employs multiple layers of charging cells configured in accordance with certain aspects disclosed herein. The charging device may be constructed from four layers of charging cells 202, 204, 206, 208. In FIG. 2, each power transfer area provided by a charging cell in the first layer of charging cells 202 is marked "L1", each power transfer area provided by a charging cell in the second layer of charging cells 204 is marked "L2", each power transfer area provided by a charging cell in the third layer of charging cells 206 is marked "L3", and each power transfer area provided by a charging cell in the fourth layer of charging cells 208 is marked "L4". The charging cells 202, 204, 206, 208 may be provided by power transfer areas of transmitting coils that are polygonal in shape. In other implementations, the charging coils may comprise spirally wound planar coils constructed from wires, each being wound to provide a substantially circular power transfer area. In the latter examples, multiple spirally wound planar coils may be deployed in stacked planes below the charging surface of a wireless charging device.

Figure 3:
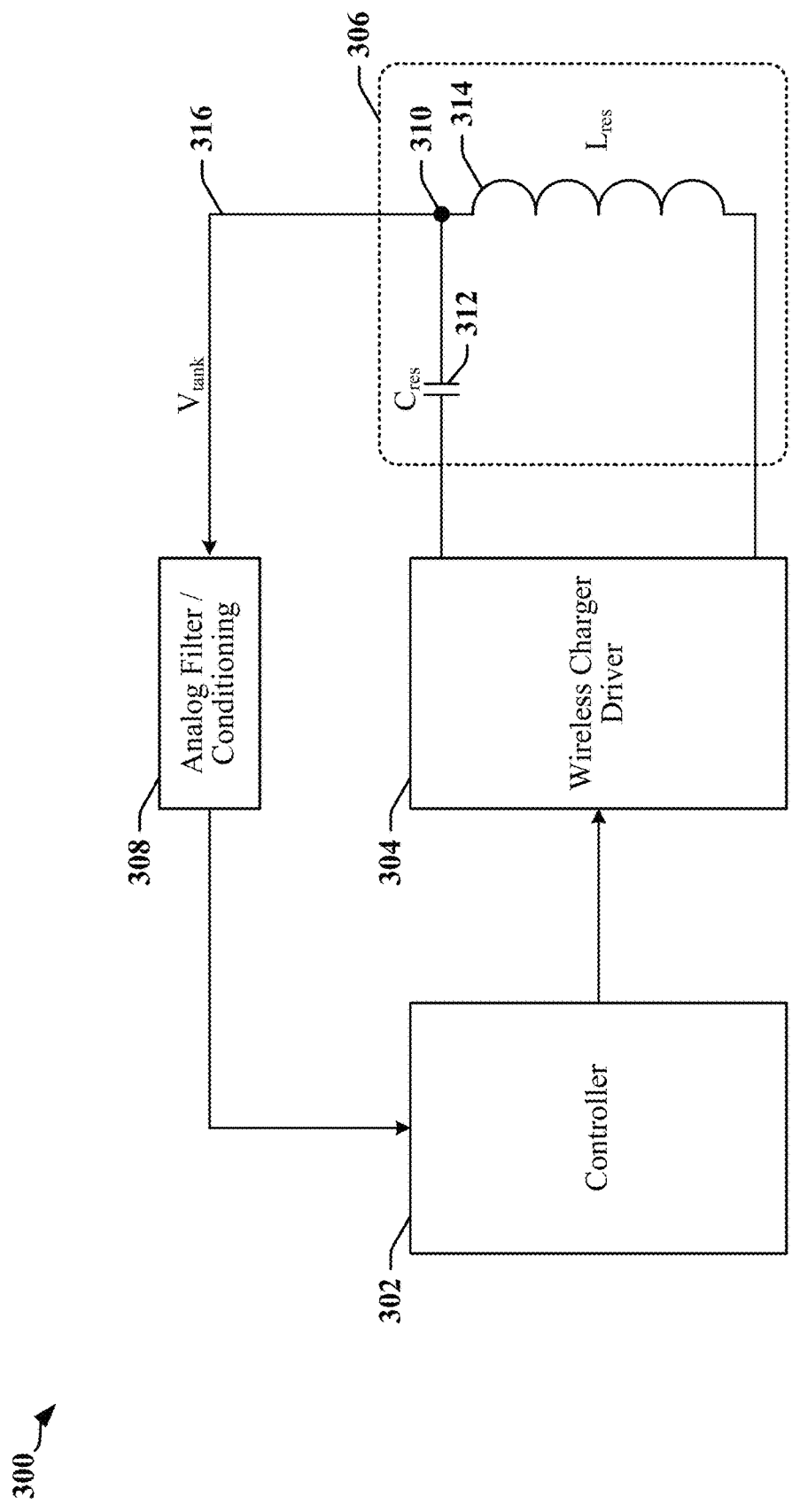
FIG. 3 illustrates a wireless power transmitter that may be provided in a charger base station in accordance with certain aspects disclosed herein.

FIG. 3 illustrates a wireless transmitter 300 that may be provided in a charger base station. A controller 302 may receive a feedback signal that is filtered or otherwise processed by a conditioning circuit 308. The controller may control the operation of a driver circuit 304 that provides an alternating current to a resonant circuit 306 that includes a capacitor 312 and inductor 314. The resonant circuit 306 may also be referred to herein as a tank circuit, an LC tank circuit and/or as an LC tank, and the voltage 316 measured at an LC node 310 of the resonant circuit 306 may be referred to as the tank voltage.

The wireless transmitter 300 may be used by a charging device to determine if a compatible device has been placed on a surface of the charging device. For example, the charging device may determine that a compatible device has been placed on the surface of the charging device by sending an intermittent test signal (active ping or digital ping) through the wireless transmitter 300, where the resonant circuit 306 may detect or receive encoded signals when a compatible device responds to the test signal or modifies a characteristic of the test signal. The charging device may be configured to activate one or more coils in at least one charging cell after receiving a response signal defined by standard, convention, manufacturer or application. In some examples, the compatible device can respond to a ping by communicating received signal strength such that the charging device can find an optimal charging cell to be used for charging the compatible device.

Passive ping techniques may use the voltage and/or current measured or observed at the LC node 310 to identify the presence of a receiving coil in proximity to the charging pad of a device adapted in accordance with certain aspects disclosed herein. In many conventional wireless charger transmitters, circuits are provided to measure voltage at the LC node 310 or to measure the current in the network. These voltages and currents may be monitored for power regulation purposes and/or to support communication between devices. In the example illustrated in FIG. 3, voltage at the LC node 310 is monitored, although it is contemplated that current may additionally or alternatively be monitored to support passive ping in which a short pulse is provided to the resonant circuit 306. A response of the resonant circuit 306 to a passive ping (initial voltage Vo) may be represented by the voltage ($V_{LC}$) at the LC node 310, such that:

$$V_{LC} = V_0 e^{-\left(\frac{\omega}{2Q}\right)t} \quad \text{(Eq. 1)}$$

According to certain aspects disclosed herein, coils in one or more charging cells may be selectively activated to provide an optimal electromagnetic field for charging a compatible device. In some instances, coils may be assigned to charging cells, and some charging cells may overlap other charging cells. In the latter instances, the optimal charging configuration may be selected at the charging cell level. In other instances, charging cells may be defined based on placement of a device to be charged on a surface of the charging device. In these other instances, the combination of coils activated for each charging event can vary. In some implementations, a charging device may include a driver circuit that can select one or more cells and/or one or more predefined charging cells for activation during a charging event.

RFID

In certain aspects of the disclosure, a charging device may refrain from activating one or more wireless charging coils when an RFID tag is detected at or near a surface of a wireless charging device, and/or when the RFID tag might be damaged if the wireless charging coil were activated. RFID technology was initially used in identification systems and RFID tags are conventionally used for inventory control purposes, at point of sale and/or at exits of a commercial establishment. RFID technology may be provided in mobile devices, such as smartphones to permit interactions with other mobile devices and other RFID systems. Some smartphones support Near Field Communication (NFC) protocols, including standards-defined communication protocols that enable two devices to communicate over a distance of up to 4 cm, and which find use in mobile payment systems and the like. Some NFC-enabled devices can be used to read RFID tags and/or to otherwise function in a similar manner as RFID tags. Certain aspects of this disclosure are described using examples of RFID systems, although the concepts may be equally applicable to NFC systems and NFC-equipped items.

Figure 4:
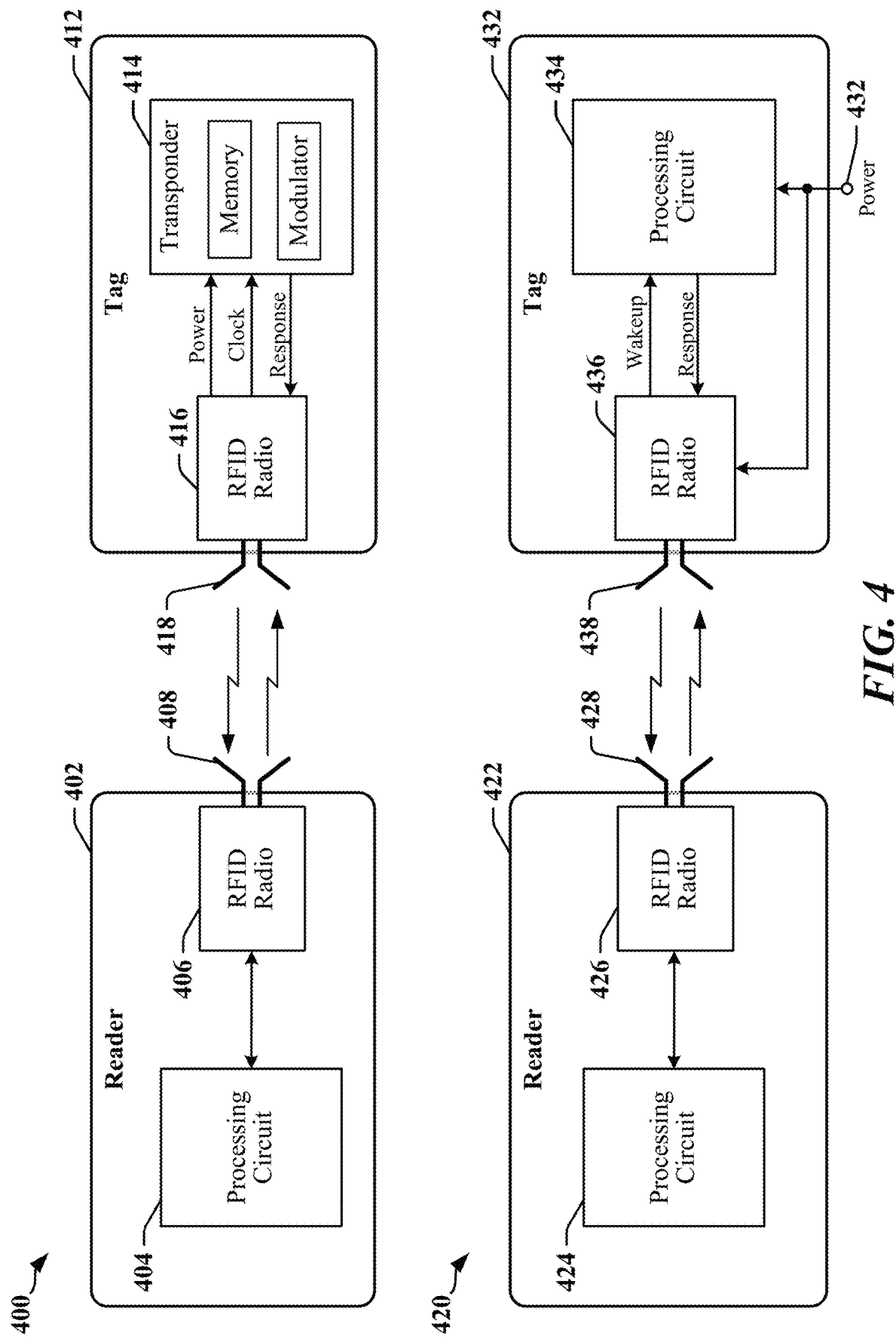
FIG. 4 illustrates radio frequency identification (RFID) systems.

FIG. 4 illustrates certain examples of RFID system configuration 400, 420. In each example, an RFID reader 402, 422 includes a processing circuit 404, 424 and an RFID radio 406, 426. The RFID radio 406, 426 may operate at one of several frequencies defined for use with certain types of RFID tags. In one example, the RFID radios 406, 426 may be configured to transmit or receive at 13.56 MHz when used in certain smart card applications. In another example, the RFID radios 406, 426 may be operable in the 2.45 GHz-5.80 GHz bands that are defined for use in IEEE 802.11 wireless local area network (WLAN) and Bluetooth standards. In another example, the RFID radios 406, 426 may operate at frequencies of 3.1-10 GHz in ultra-wideband applications. The RFID reader 402, 422 includes an antenna 408, 428 that may be configured according to the frequency bands to be used by the RFID radios 406, 426.

In a first configuration 400, the RFID system supports the use of passive RFID tags 412. A passive RFID tag 412 does not include its own power source, but is instead powered by small amounts of energy extracted from the RF field generated by an interrogator which may be included in the RFID reader 402. The interrogator transmits an RFID interrogation signal at a frequency that causes the RFID tag 412 to wake and provide a response code. The RFID interrogation signal is transmitted at a power level sufficient to allow the RFID tag 412 to extract sufficient energy to transmit the response code. In one example, the RFID radio 416 detects and recognizes the RFID interrogation signal and generates power for its own use and for the use of a transponder circuit 414. In some instances, the RFID radio 416 provides a clock signal used by the transponder circuit 414. The transponder circuit 414 may include a state machine or other sequencing logic.

The passive RFID tag 412 includes an antenna 418 configured according to the frequency bands to be used by the RFID radio 416. In one example, the RFID radio 416 and the transponder circuit 414 are provided on a single semiconductor integrated circuit (IC) or chip, and the antenna 418 may be fabricated in the IC, provided in a metallization or other conductive layer on the IC, painted on a casing of the IC or located apart from, or proximately to the chip. Passive RFID tags 412 typically operate at lower frequencies selected from the low-frequency 120-150 kHz range, and/or up to the 13.56 MHz operating frequency for RFID in smartcards and other such devices. Certain passive RFID tags 412 may be configured to detect and recognize RFID interrogation signals at the high-frequency end or ultra-high frequency (UHF) band, including 433 MHz.

In a second configuration 400, the RFID system supports the use of active or power-assisted RFID tags 432. The active or power-assisted RFID tag 432 receives an external power source, and can engage in more complex communication and/or can transmit at higher frequencies. The active or power-assisted RFID tag 432 typically includes a processing circuit 434 that can perform and manage certain functions. The active or power-assisted RFID tag 432 typically includes a memory that can provide detailed information beyond the serial number stored by a passive RFID tag 412. In one example, the RFID radio 436 detects and recognizes RFID signals and may generate a wakeup signal that causes the processing circuit 434 to decode the incoming RFID signal, configure a response message and cause the RFID radio 436 to transmit the response message. The processing circuit 434 typically includes a processor, controller and/or state machine, which may be configurable during operation. The active or power-assisted RFID tag 432 includes an antenna 438 configured according to the frequency bands to be used by the RFID radio 436. In one example, the antenna 438 may be structured as a coil antenna.

RFID tags 412, 432 are designed to operate at low transmission power. The antennas 418, 438 are typically designed to handle low-power RFID signals, and the RFID radios 416, 436 include receiving and transmitting circuits that are expected to operate on low current and/or low voltage signals. Wireless charging coils can potentially induce signals in the receiving and transmitting circuits of the RFID radios 416, 436 and/or in the antennas 418, 438 that have power levels sufficient to damage the RFID radios 416, 436 or antennas 418, 438.

Certain aspects of this disclosure provide systems methods and techniques for detecting the presence of RFID tags 412, 432 on or near the surface of a wireless charger before initiating charging of a device placed on the surface proximate to the RFID tag 412, 432. In one example, an RFID tag 412, 432 may be embedded in a credit card that is housed in a cover of a chargeable device, such as a smartphone. The smartphone may be placed in its cover on a surface of the charging device for charging, thereby creating a risk that the RFID tag 412, 432 will be damaged by the electromagnetic charging flux emanating from the surface of the charging device. Reliable detection of the RFID tags 412, 432 may prevent damage to the RFID tags 412, 432. In certain implementations, one or more RFID readers 402, 422 may be incorporated into a wireless transmitter in multi-device charging device. RFID readers 402, 422 can be used to detect the presence of RFID tags 412, 432 before wireless power transfer has been initiated through one or more zones or areas of the charging surface. In some implementations, detection of the presence of an RFID tag 412, 432 can cause one or more wireless charging coils to be excluded from charging configurations and may prevent a charging current from being applied to one or more wireless charging coils.

Figure 5:
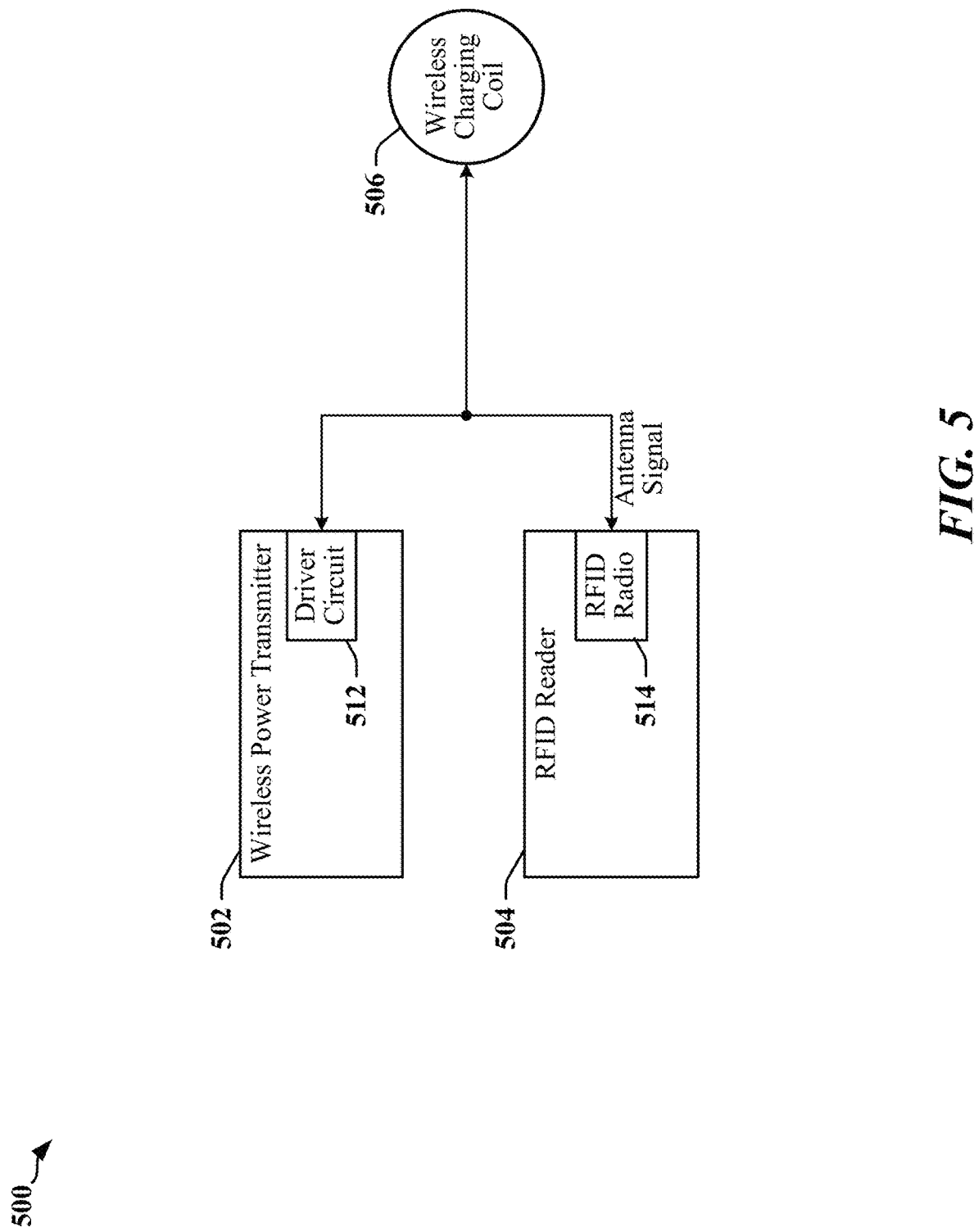
FIG. 5 illustrates a first example of a charging device that may be adapted in accordance with certain aspects of this disclosure.

With reference to the example 500 illustrated in FIG. 5, a charging device adapted in accordance with certain aspects of this disclosure includes a wireless power transmitter 502 and an RFID reader 504. The wireless power transmitter 502 may correspond to the wireless transmitter 300 of FIG. 3, and the RFID reader 504 may correspond to the RFID reader 402 or 422 of FIG. 4. The wireless power transmitter 502 may include a driver circuit 512 configured to provide a charging current to one or more wireless charging coils 506. The driver circuit 512 may correspond to the driver circuit 304 illustrated in FIG. 3.

In certain implementations, the one or more wireless charging coils 506 can serve as an antenna for an RFID radio 514 in the RFID reader 504. A wireless charging coil 506 may serve as the antenna for wireless power transfer and for RFID signaling when the wireless power transfer operates at the same frequency or at a harmonic frequency of the RFID radio frequency. In one example, the wireless charging coil 506 may also serve as the antenna for wireless power transfer in a wireless charging system defined by the Alliance for Wireless Power (A4WP) that transfers power at a relatively high frequency of 6.78 MHz, which is half the frequency of the upper frequency 13.56 MHz of certain passive RFID technologies.

Figure 6:
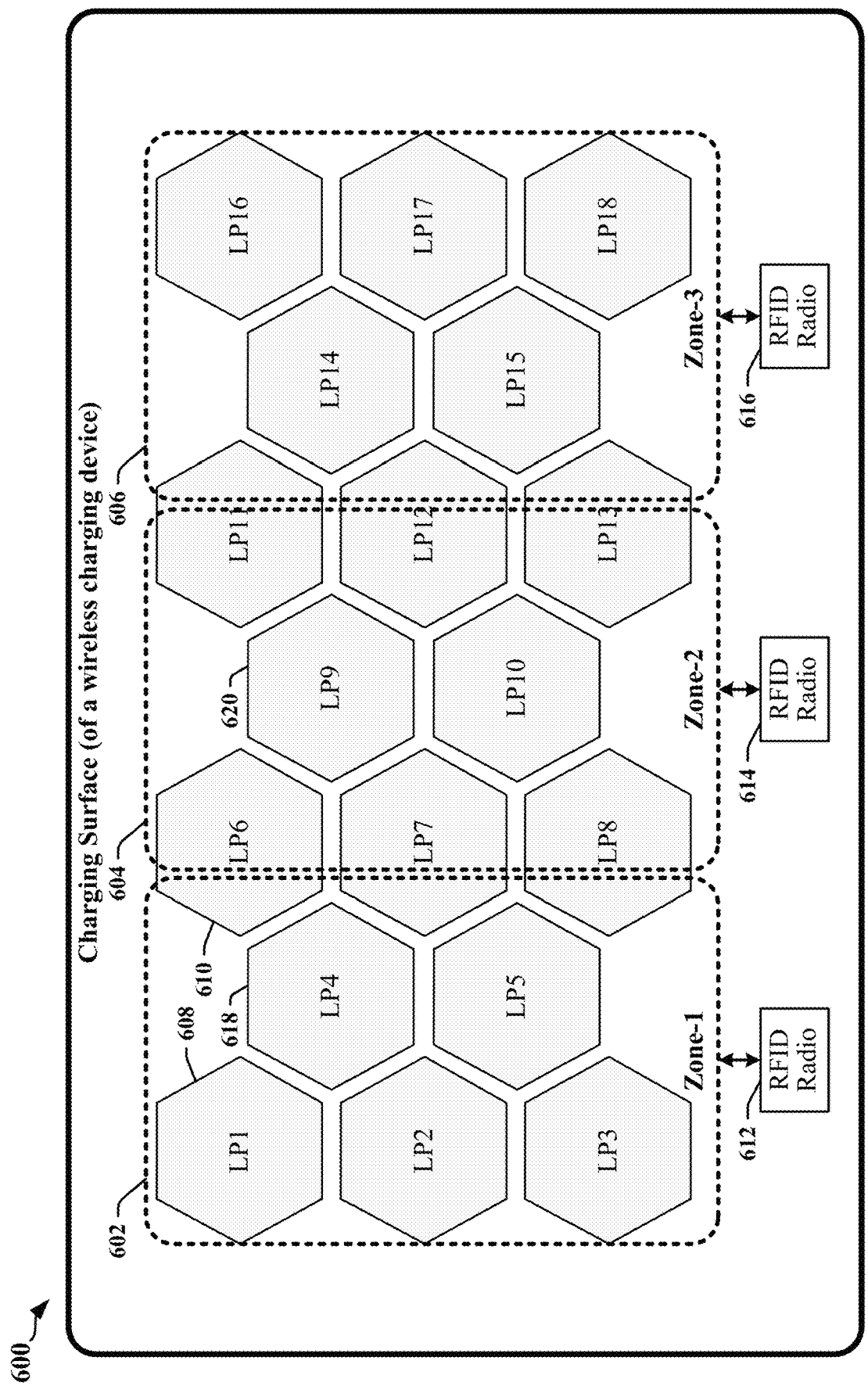
FIG. 6 illustrates a second example of a charging device that may be adapted in accordance with certain aspects of this disclosure.

With reference to the example illustrated in FIG. 6, a charging device adapted in accordance with certain aspects of this disclosure includes multiple RFID radios 612, 614, 616 configured to monitor different zones 602, 604, 606 or areas across the surface 600 of the wireless charging device. A multi-device wireless charging device equipped with multiple RFID radios 612, 614, 616 can be configured such that each chargeable device placed on the surface 600 of the wireless charging device is monitored and/or interrogated by a dedicated RFID radio 612, 614, 616. The size, shape and location of the zones 602, 604, 606 may be fixed or predetermined by design, or may be configured based on the location and orientation of detected chargeable devices. A multi-device wireless charging device equipped with multiple RFID radios can be configured such that each chargeable device placed on the surface 600 of the wireless charging device is aligned or monitored by a dedicated RFID radio 612, 614, 616.

In another example, a charging device adapted in accordance with certain aspects of this disclosure uses one or more wireless charging coils 608, 610 to serve as the antenna for RFID tag detection purposes. Some wireless charging coils 608 coupled to the RFID radio 612, 614, 616 associated with a zone 602, 604, 606 may lie fully within the zone 602, 604, 606 monitored by the RFID radio 612, 614, 616, while other wireless charging coils 610 coupled to the RFID radio 612, 614, 616 may lie partially within the zone 602, 604, 606 monitored by the RFID radio 612, 614, 616. In the latter example, certain wireless charging coils 610 may be coupled to different RFID radios 612, 614, 616 at different times, such that adjacent RFID radios 612, 614, 616 may be operated at mutually exclusive times to detect the presence of an RFID tag within the corresponding zone 602, 604, 606 on the surface 600 of the wireless charging device.

In another example, a charging device adapted in accordance with certain aspects of this disclosure couples selected wireless charging coils 608, 610, 618 and/or 620 to an RFID radio 612, 614, 616 for use as the antenna for RFID tag detection purposes for a detected chargeable device. For example, the wireless charging device may determine that a chargeable device is to be charged using wireless charging coils 610, 618 and 620 and, regardless of the zone 602, 604, 606 in which the wireless charging coils 610, 618 and 620 lie, these wireless charging coils 610, 618 and 620 are coupled to the RFID radio 612, 614, 616 designated for the detected chargeable device.

Figure 7:
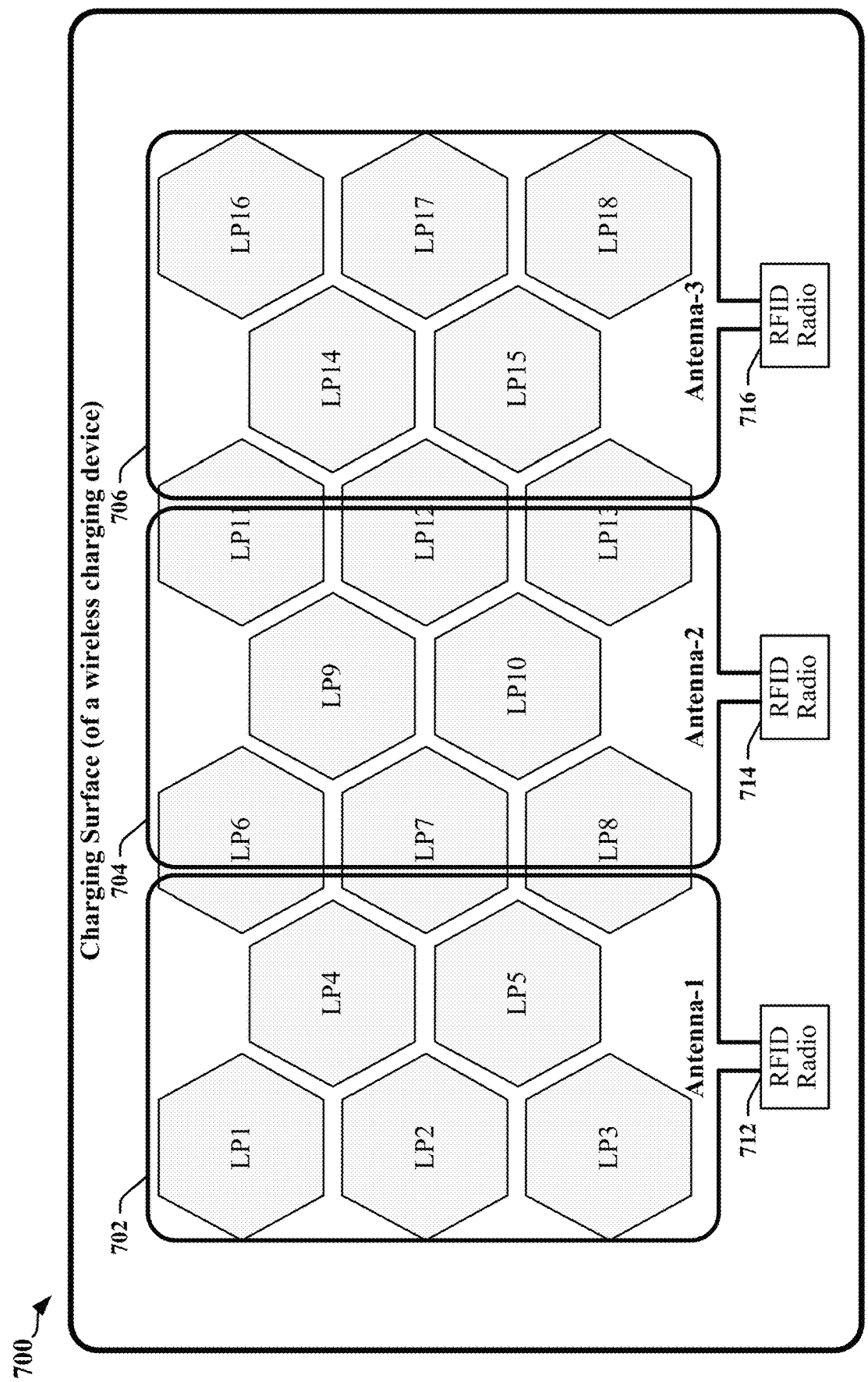
FIG. 7 illustrates a third example of a charging device that may be adapted in accordance with certain aspects of this disclosure.

With reference to the example illustrated in FIG. 7, a charging device adapted in accordance with certain aspects of this disclosure includes multiple RFID radios 712, 714, 716, each coupled to a dedicated RFID antenna 702, 704, 706. The RFID antennas 702, 704, 706 define corresponding monitored zones on the surface 700 of a wireless charging device. The RFID antennas 702, 704, 706 may correspond to the boundaries of the monitored zones. The RFID antennas 702, 704, 706 may be deployed across the surface 700 of the wireless charging device and may define the location, size and orientation of the monitored zones. In the illustrated example, the monitored zones have a common size and orientation, and divide the surface 700 of the wireless charging device into three equal areas. In other examples, monitored zones may have different shapes and/or sizes. In some example, monitored zones may overlap.

In the illustrated example, each RFID antenna 702, 704, 706 is formed as a loop that substantially defines the area of a corresponding monitored zone. In some instances, the RFID antennas 702, 704, 706 define the boundaries of the monitored zones precisely. In some instances, an RFID antenna can transmit and receive signals to and from an RFID tag placed some distance outside the area delineated by the RFID antennas 702, 704, 706, and the RFID antennas 702, 704, 706 approximate the boundaries of the monitored zones.

Each of the RFID antennas 702, 704, 706 is coupled to a corresponding dedicated RFID radio 712, 714, 716, which is configured to detect the presence of an RFID tag within a corresponding monitored zone on the surface 700 of the wireless charging device. Each of the RFID antennas 702, 704, 706 may include a coil that circles a monitored zone more than once, thereby providing a multi-turn coil antenna. In this example, the charging device provides antennas for RFID detection that are different from the wireless charging coils used for power transfer to the chargeable device.

Figure 8:
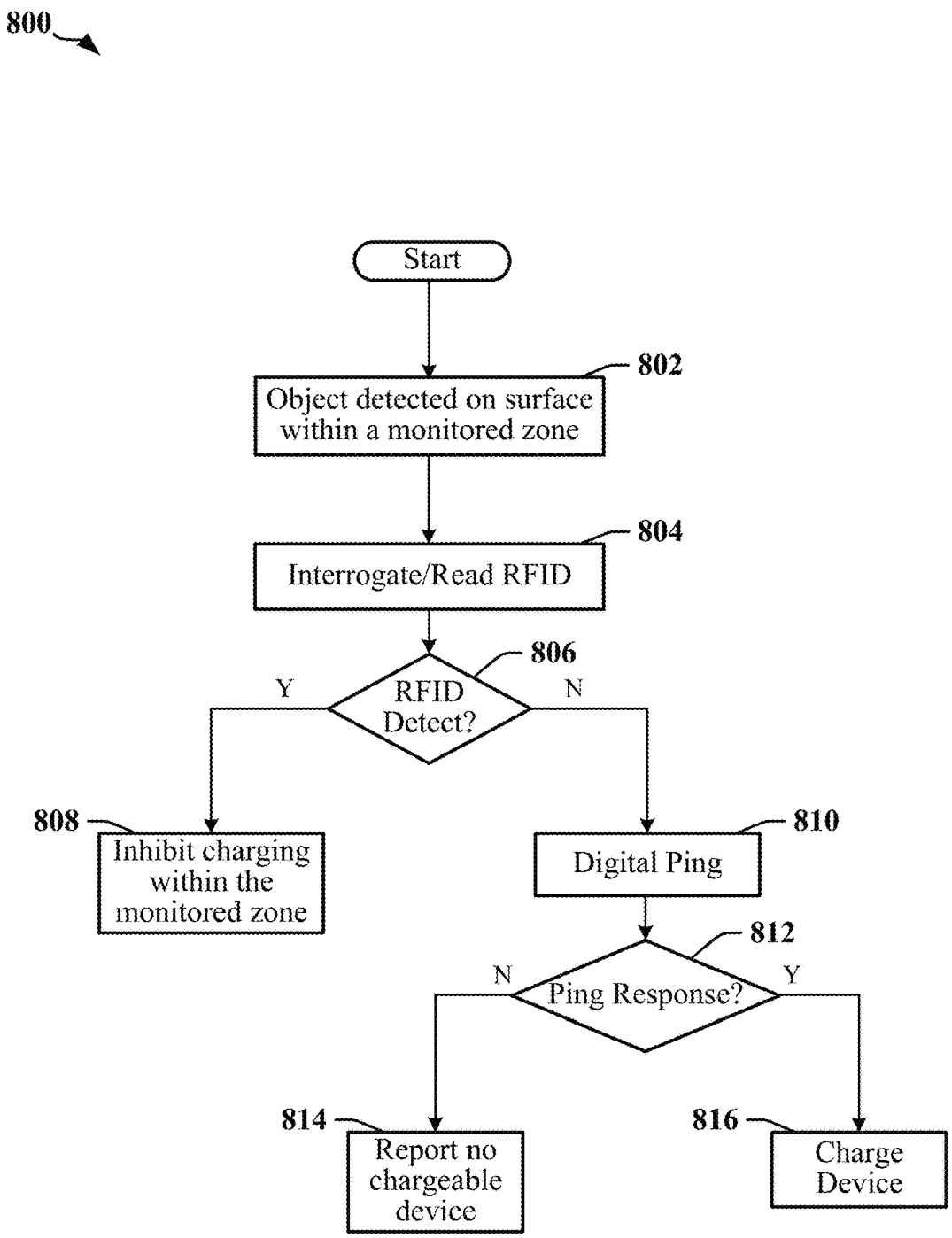
FIG. 8 is a flowchart that illustrates a first example of a method for monitoring charging surface in a wireless charging device in accordance with certain aspects of this disclosure.

FIG. 8 is a flowchart 800 that illustrates a method for monitoring at least a portion of a charging surface in a wireless charging device in accordance with certain aspects of this disclosure. The method may be performed by a controller in the wireless charging device after an object has been detected on the surface of the wireless charging device. The method may be performed periodically, and/or after detection of the object at block 802. In some instances, the object may be identified as a possible chargeable object by a passive ping. In some instances, the object may be identified as a possible chargeable object by a capacitive sense procedure in which a change in capacitance measured at one or more wireless charging coils indicates placement or removal of the object. In some examples, presence of the object may be identified using one or more sensors that detect changes in stress or strain on the surface of the wireless charging device. In other examples, presence of the object may be identified using one or more optical sensors that detect interruption of a light path. In other examples, presence of the object may be identified using one or more sensors that detect a change in electromagnetic field.

At block 804, the controller may transmit an interrogation signal through an antenna on the surface of the wireless charging device. The interrogation signal may be configured to wake up one or more RFID tags that may be located on or near the surface of the wireless charging device. The interrogation signal may have sufficient energy to power passive RFID tags that may be located on or near the surface of the wireless charging device. An RFID tag that receives the interrogation signal may be expected to transmit a response and, at block 806, the controller may determine whether a response signal has been received that indicates presence of at least one RFID tag located on or near the surface of the wireless charging device. When a response signal is received from an RFID tag, then at block 808, the controller may inhibit charging through one or more wireless charging coils that are configured to provide a charging flux through an area of the surface covered by the antenna that transmits the interrogation signal.

When no response signal is received from an RFID tag, then at block 810, the controller may transmit a digital ping or other higher-powered discovery signal to the detected object through one or more wireless charging coils. The digital ping or other higher-powered discovery may be configured to enable the controller to determine whether the detected object is a chargeable object, and to provide a charging configuration that defines transmitted power levels and one or more wireless charging coils to be used for charging a responding chargeable object.

At block 812, the controller may determine whether a chargeable object has responded to the digital ping or other higher-powered discovery signal. When no response is received at block 812, them at block 814, the controller may treat the detected object as a foreign object and terminate the procedure. When a response is received at block 812, then at block 816, the controller may configure a suitable charging configuration and commence charging the responding chargeable object.

Figure 9:
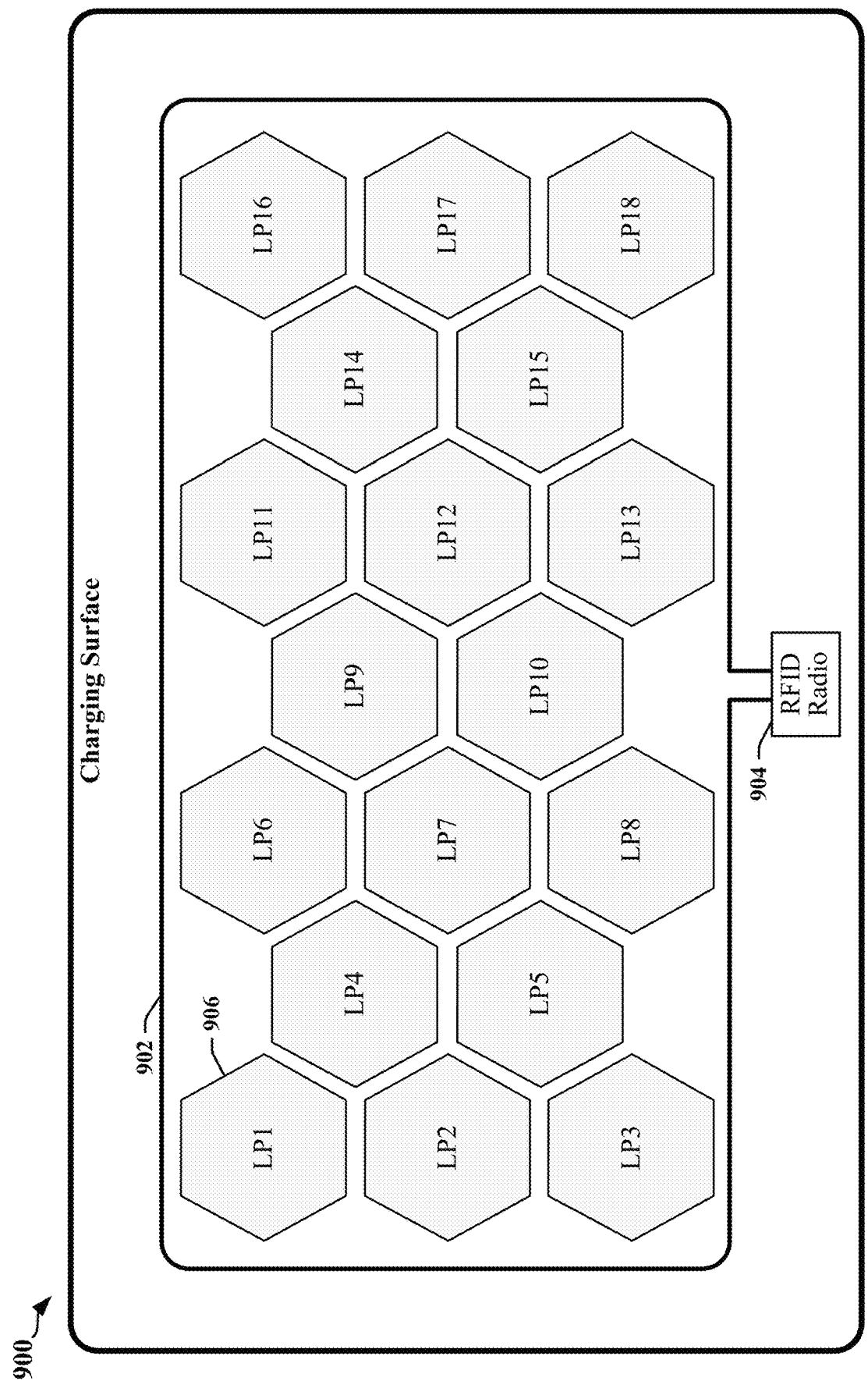
FIG. 9 illustrates a fourth example of a charging device that may be adapted in accordance with certain aspects of this disclosure.

With reference to the example illustrated in FIG. 9, a charging device adapted in accordance with certain aspects of this disclosure includes a single RFID radio 904 that is coupled to a single RFID antenna 902 that substantially defines a monitored zone on the surface 900 of a multi-device wireless charging device. The RFID radio 904 may be configured to track placement of chargeable devices on the surface 900 of the wireless charging device and to initiate an interrogation procedure to determine if the newly placed chargeable device is associated with an RFID tag.

In the illustrated example, RFID antenna 902 is formed as a loop that surrounds the wireless charging coils that provide charging flux through the surface 900 of the wireless charging device. The RFID antennas 902 may include a coil that circles the surface 900 of the multi-device wireless charging device more than once, thereby providing a multi-turn coil antenna. In some instances, the RFID antenna 902 defines the boundary of the monitored zone precisely. In some instances, the RFID antenna 902 can transmit and receive signals to and from an RFID tag placed some distance outside the area delineated by the RFID antenna 902, and the RFID antenna 902 approximates the boundary of the monitored zone. The RFID antenna 902 is coupled to a dedicated RFID radio 904, which is configured to detect the presence of an RFID tag within the monitored zone on the surface 900 of the wireless charging device. In this example, the charging device provides an antenna for RFID detection that is different from the wireless charging coils used for power transfer to the chargeable device. In other examples, the RFID radio 904 may be coupled to multiple wireless charging coils 906 that can serve as an antenna providing RFID coverage for the surface 900 of the wireless charging device. In one example, all of the wireless charging coils 906 are used to form an RFID antenna. In another example, wireless charging coils 906 located on the periphery of the surface 900 of the wireless charging device are used to form an RFID antenna.

The use of a single RFID radio 904 coupled to a single RFID antenna 902 that substantially defines the monitored zone on the surface 900 of a wireless charging device may be operated in a multi-device mode by tracking placements of objects on placements the surface 900 and subsequent moves or removals of those objects with respect to the surface 900. It can be expected that a controller in the wireless charging device can detect each placement, moving and/or removal event because of the finite time difference in placement of objects. It is unlikely that any two objects would be placed, moved or removed at exactly the same time. The controller may be configured to maintain information concerning the state of the surface 900 of the wireless charging device and certain characteristics of objects placed on the surface 900.

In certain implementations, the controller may be configured to determine whether an object placed on the surface 900 has an attached or accompanying RFID tag, and thereafter associate the RFID tag with the object. For example, when no object is present on or near the surface 900, a first device may be placed on the surface 900. The first device may be attached to a first RFID tag, and the controller may inhibit charging of the first device. A second device may subsequently be placed on the surface 900, causing the controller to interrogate any RFID tags on or near the surface 900. The interrogation can be expected to identify the first RFID tag and any other RFID tags. The controller associates the first RFID tag with the first object and can eliminate the first RFID tag from consideration when determining whether the second object should be charged. The controller may commence charging for the second object provided a second RFID tag is not detected.

Figure 10:
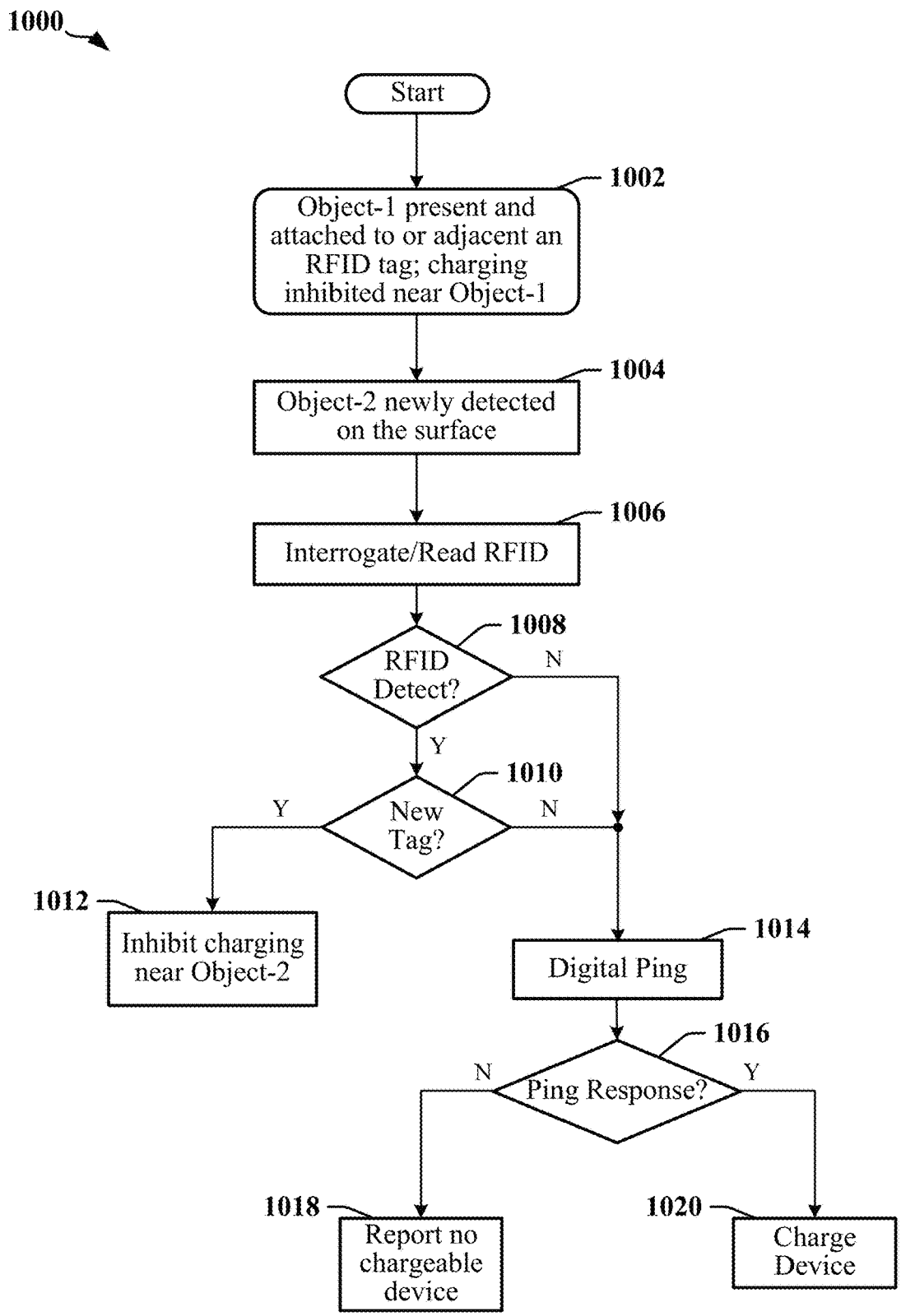
FIG. 10 is a flowchart that illustrates a second example of a method for monitoring a charging surface in a wireless charging device in accordance with certain aspects of this disclosure.

FIG. 10 is a flowchart 1000 that illustrates a method for monitoring at least a portion of a charging surface in a wireless charging device using a single RFID radio in accordance with certain aspects of this disclosure. The method may be employed when the RFID radio is used to monitor an area of the charging surface in which more than one chargeable device may be placed. In some implementations, the RFID radio is used to monitor the entire charging surface.

The method may be performed by a controller in the wireless charging device after at least one object has been detected on the surface of the wireless charging device. The method may be performed in a context 1002 in which a first object has been detected and associated with a first RFID tag, and where charging has been inhibited in the vicinity of the first object. The method may be performed periodically, and/or after detection of a second object at block 1004. The second object may be identified as a possible chargeable object by a passive ping. The second object may be identified as a possible chargeable object by a capacitive sense procedure in which a change in capacitance measured at one or more wireless charging coils indicates placement or removal of the second object. In one example, presence of the object may be identified using one or more sensors that detect changes in stress or strain on the surface of the wireless charging device. In another example, presence of the object may be identified using one or more optical sensors that detect interruption of a light path. In another example, presence of the object may be identified using one or more sensors that detect a change in electromagnetic field.

At block 1006, the controller may transmit an interrogation signal through an antenna on the surface of the wireless charging device. The interrogation signal may be configured to wake up one or more RFID tags that may be on or near the surface of the wireless charging device. The interrogation signal may have sufficient energy to power one or more passive RFID tags that may be located on or near the surface of the wireless charging device. An RFID tag that receives the interrogation signal may be expected to transmit a response and, at block 1008, the controller may determine whether a response signal has been received that indicates presence of at least one RFID tag located on or near the surface of the wireless charging device. When a response signal is received from an RFID tag, then at block 1010 the controller may determine whether a new RFID tag has been detected. The controller may ignore a response for the first RFID tag when controller has previously detected presence of the first RFID tag. The controller may be operating the wireless charging device in a mode consistent with the first RFID tag being present or near the first object. That is, the controller may have inhibited charging through one or more wireless charging coils near the first object. The controller may determine that a second RFID tag has responded to the interrogation initiated at block 1006 and may proceed to block 1012, where charging is inhibited through one or more wireless charging coils that are configured to provide a charging flux near the second object.

When a second RFID tag is not detected, then at block 1014, the controller may transmit a digital ping or other higher powered discovery signal to the second object through one or more wireless charging coils. The digital ping or other higher powered discovery is configured to enable the controller to determine whether the second object is a chargeable object, and to provide a charging configuration that defines transmitted power levels and one or more wireless charging coils to be used for charging a responding chargeable object.

At block 1016, the controller may determine whether a chargeable object has responded to the digital ping or another higher-powered discovery signal. When no response is received at block 1016, them at block 1018, the controller may treat the detected object as a foreign object and terminate the procedure. When a response is received at block 1016, them at block 1020 the controller may configure a suitable charging configuration and commence charging the responding chargeable object.

Figure 11:
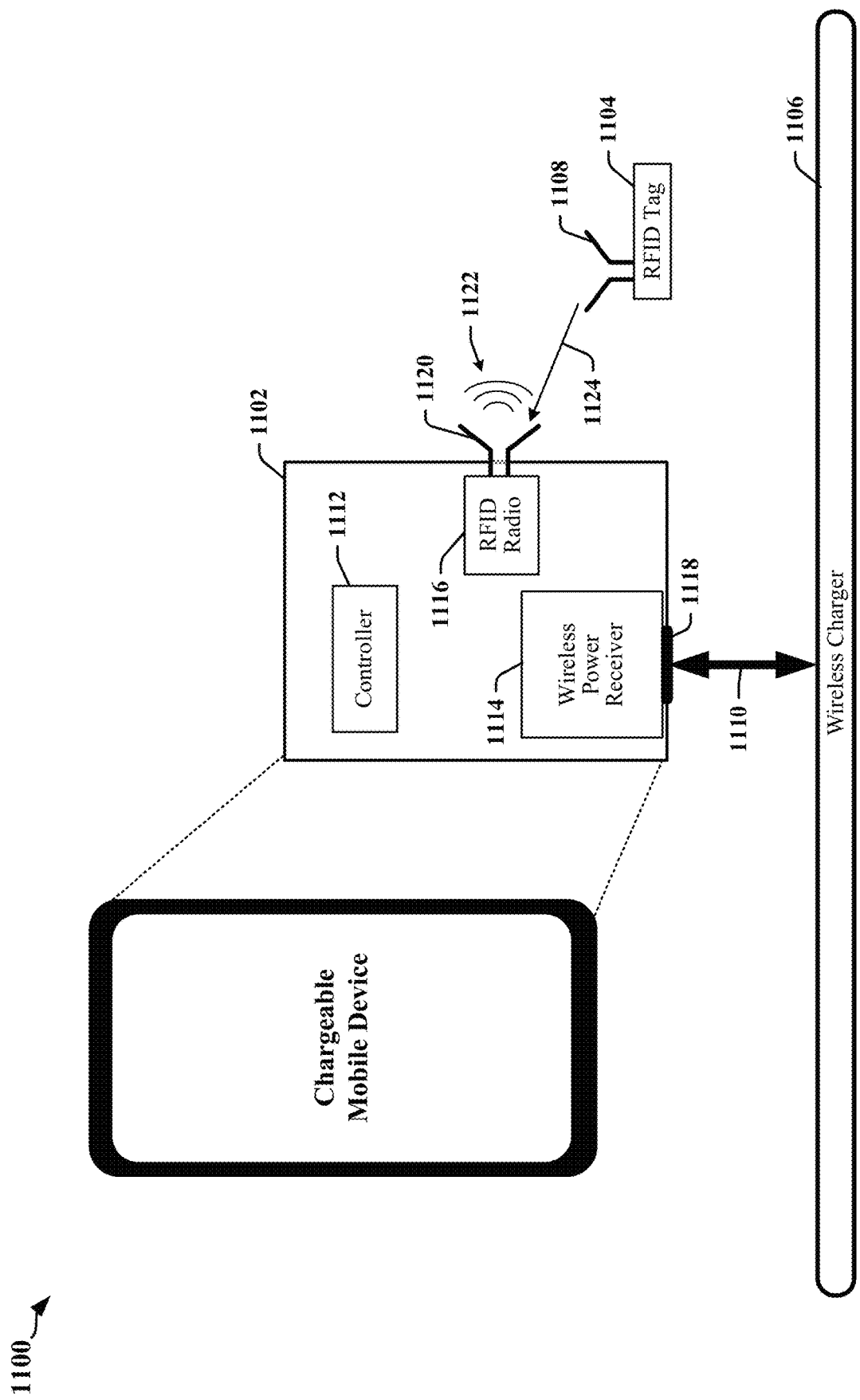
FIG. 11 illustrates an example of mobile device that may be adapted in accordance with certain aspects disclosed herein.

FIG. 11 illustrates an example of mobile device 1100 that can be configured to detect the presence of an RFID tag 1104 when the mobile device 1100 is placed on or near the surface of a wireless charger 1106 and before receiving an electromagnetic flux 1110 from the wireless charger 1106. The mobile device 1100 has a processing circuit 1102 that includes a controller 1112 or other processor and that further includes, or is coupled to a wireless power receiver 1114 and a RFID radio 1116. The mobile device 1100 may be a cellular telephone, a smartphone, a multimedia device, a video device, a digital audio player (e.g., MP3 player), a camera, an entertainment device, a wearable computing device (e.g., a smart watch, a health or fitness tracker, eyewear, etc.), an appliance, a sensor, a security device, a drone, a multicopter, or any other similar functioning device.

The wireless power receiver 1114 includes, or is coupled to a receiving coil 1118 that is configured to generate a charging current in response to electromagnetic flux 1110 received from the wireless charger 1106. The receiving coil 1118 functions as an antenna that is tuned to the frequency of the electromagnetic flux 1110. The RFID radio 1116 may be configured to transmit and receive signals 1122, 1124 through an RFID antenna 1120 at frequencies defined by RFID standards and protocols. The receiving coil 1118 performs the functions of the RFID antenna 1120. The RFID tag 1104 includes an antenna 1108 and may operate as a passive or active RFID tag.

In certain implementations, the controller 1112 may be configured to detect the presence of an RFID tag 1104 and may prevent wireless charging when an RFID tag 1104 is determined to be present. The processing circuit 1102 may be configured to notify a user of the mobile device 1100 that an RFID tag 1104 is present and that the RFID tag 1104 should be removed from any location between the receiving coil 1118 and the surface of the wireless charger 1106 to enable charging to commence.

Figure 12:
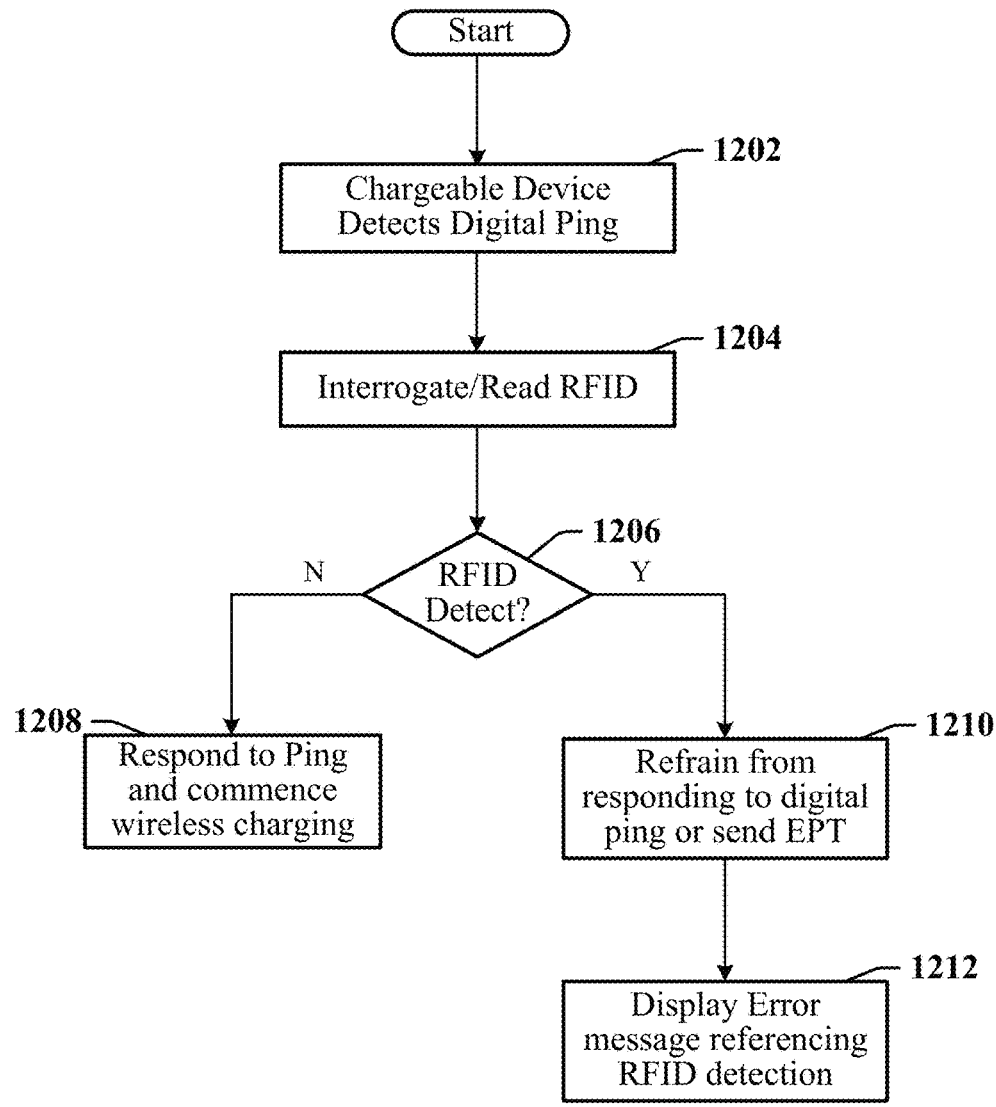
FIG. 12 is a flowchart that illustrates a third example of a method for monitoring a charging surface in a wireless charging device in accordance with certain aspects of this disclosure.

FIG. 12 is a flowchart 1200 illustrating the operation of a mobile device 1100 that is configured to prevent charging when presence of an RFID tag 1104 has been detected. The method may be performed by a controller 1112 in the mobile device 1100. At block 1202, the controller 1112 may detect a digital ping. The digital ping may be transmitted by the wireless charger 1106 and may be configured to identify the mobile device 1100, determine capabilities of the mobile device 1100, ascertain state of the mobile device and/or determine a charging configuration.

According to certain aspects of the disclosure, at block 1204 the controller 1112 may cause its RFID radio 1116 to transmit an RFID interrogation signal 1122. The RFID interrogation may wake up any RFID tag 1104 located near the mobile device 1100, and/or provide power to passive RFID tags 1104. A RFID tag 1104 detecting the RFID interrogation signal 1122 responds by transmitting a response signal 1124 that carries an identifier of the RFID tag 1104 and/or a message. If at block 1206 the controller 1112 does not detect a response signal 1124, the method continues at block 1208 where the controller 1112 responds to the digital ping, and may engage in charging of the mobile device 1100.

If at block 1206 the controller 1112 detects a response signal 1124 after the RFID interrogation signal, then the method proceeds to block 1210. At block 1210, the controller 1112 may decline charging of the mobile device 1100. In one example, the controller 1112 may decline charging of the mobile device 1100 by refraining from responding to the digital ping. In another example, the controller 1112 may decline charging of the mobile device 1100 by sending an "End Power Transfer" (EPT) message to the wireless charger 1106. At block 1212, the controller 1112 may display an error message on the mobile device 1100 indicating the presence of the RFID tag 1104. The message may also suggest moving the RFID tag 1104 out of range of the wireless charger 1106.

In certain implementations, the RFID radio 1116 may be used for near-field communication with the wireless charger 1106. In these implementations, the wireless charger 1106 may be equipped with its own RFID radio, such as one or more of the RFID radios 612, 614, 616, 712, 714, 716, 904 illustrated in FIGS. 6, 7 and 9. The wireless charger 1106 may use its RFID radio to participate in the near-field communication with the mobile device 1100. The near-field communication may be conducted in accordance with standards-defined protocols and may involve exchange of large volumes of data while the mobile device 1100 is being charged by the wireless charger 1106. In one example, the near-field communication may be used to transfer firmware updates from the mobile device 1100 to the wireless charger 1106. In another example, the near-field communication may be used to transfer state statistics and/or charging data from the wireless charger to the receiving device.

Example of a Processing Circuit

Figure 13:
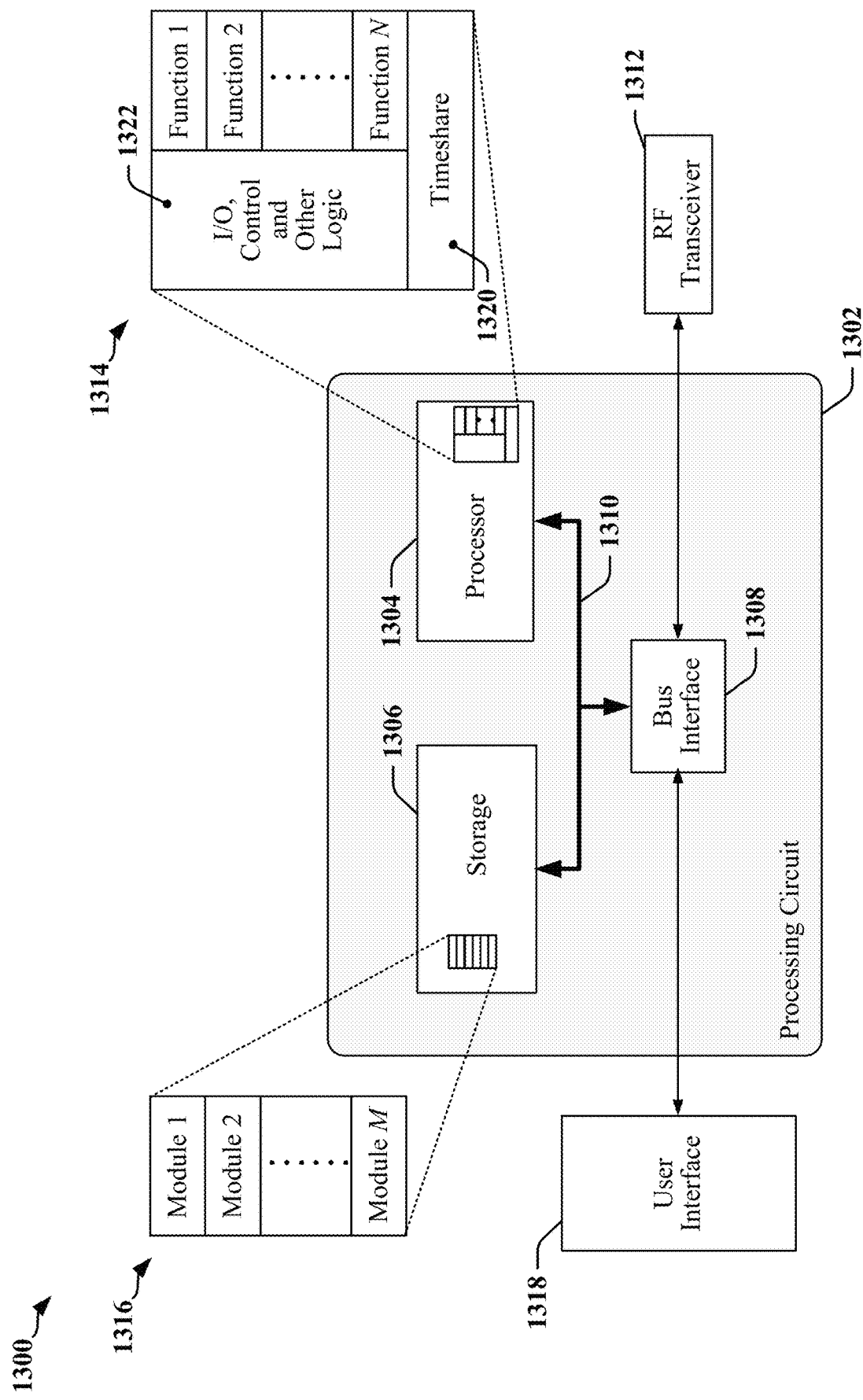
FIG. 13 illustrates one example of an apparatus employing a processing circuit that may be adapted according to certain aspects disclosed herein.

FIG. 13 illustrates an example of a hardware implementation for an apparatus 1300 that may be incorporated in a charging device or in a receiving device that enables a battery to be wirelessly charged. In some examples, the apparatus 1300 may perform one or more functions disclosed herein. In accordance with various aspects of the disclosure, an element, or any portion of an element, or any combination of elements as disclosed herein may be implemented using a processing circuit 1302. The processing circuit 1302 may include one or more processors 1304 that are controlled by some combination of hardware and software modules. Examples of processors 1304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media and/or processor-readable media. The storage 1306 may include transitory storage media and/or non-transitory storage media.

The bus 1310 may also link various other circuits such as timing sources, timers, peripherals, voltage regulators, and power management circuits. A bus interface 1308 may provide an interface between the bus 1310 and one or more transceivers 1312. In one example, a transceiver 1312 may be provided to enable the apparatus 1300 to communicate with a charging or receiving device in accordance with a standards-defined protocol. Depending upon the nature of the apparatus 1300, a user interface 1318 (e.g., keypad, display, speaker, microphone, joystick) may also be provided, and may be communicatively coupled to the bus 1310 directly or through the bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer-readable medium. The external computer-readable medium and/or storage 1306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain and/or organize software in loadable code segments, modules, applications, programs, etc., which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as a transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to a transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

In one implementation, the apparatus 1300 includes or operates as a wireless charging apparatus that has a battery charging power source coupled to a driver circuit, a plurality of charging cells and a controller, which may be included in the one or more processors 1304. The plurality of charging cells may be configured to provide a charging surface. In each charging cell, at least one transmitting coil may be configured to direct an electromagnetic field through a charge transfer area. The driver circuit may be configured to provide a charging current to the transmitting coils. The apparatus 1300 may include a radio interface configured for transmitting and receiving RFID signals. The controller may be configured to transmit an interrogation signal configured to stimulate RFID tags through the radio interface when a chargeable device is initially placed on or near a surface of the wireless charger, refrain from initiating wireless charging of a chargeable device when a response to the interrogation signal is received, and negotiate a charging configuration when a response to the interrogation signal is not received.

In some implementations, the apparatus 1300 includes an antenna circuit comprising one or more of the transmitting coils. The one or more coils may be configured to receive the charging current when the wireless charger is charging the chargeable device. The controller may be configured to configure the antenna circuit to include the one or more coils based on location of the chargeable device relative to the surface of the wireless charger.

In some implementations, the apparatus 1300 includes an antenna circuit comprising a loop surrounding one or more coils of the wireless charger. The one or more coils may be configured to receive the charging current when the wireless charger is charging the chargeable device. The controller may be configured to select the one or more coils based on location of the chargeable device relative to the surface of the wireless charger.

In some implementations, the storage 1306 maintains instructions and information where the instructions are configured cause a controller to transmit an interrogation signal configured to stimulate RFID tags through a first radio interface, refrain from participating in wireless charging when a response to the interrogation signal is received, and negotiate a charging configuration when no response to the interrogation signal is received. The first radio interface may be provided in a wireless charger. The interrogation signal may be transmitted when a chargeable device is initially placed on or near a surface of the wireless charger.

In one example, the instructions are configured to cause the controller to transmit the interrogation signal through an antenna comprising one or more coils of the wireless charger. The one or more coils may be configured to receive a charging current when the wireless charger is charging the chargeable device. The instructions may cause the controller to select the one or more coils based on location of the chargeable device relative to the surface of the wireless charger. The instructions may cause the controller to configure the charging current in accordance with the charging configuration when a response signal to the interrogation signal is not received.

In another example, the instructions may cause the controller to transmit the interrogation signal through an antenna that is configured as a loop surrounding one or more coils of the wireless charger. The one or more coils may be configured to receive a charging current when the wireless charger is charging the chargeable device. The first radio interface may be one of a plurality of radio interfaces provided in the wireless charger. Each radio interface in the plurality of radio interfaces may be coupled to an associated antenna such that different portions of the surface of the wireless charger are surrounded by different antennas. The instructions may cause the controller to select the one or more coils based on location of the chargeable device relative to the surface of the wireless charger. The instructions may cause the controller to negotiate the charging configuration when the response to the interrogation signal is received from an RFID tag previously determined to be associated with a different device, and select the one or more coils based on locations of the chargeable device and the different device relative to the surface of the wireless charger.

In some implementations, the storage 1306 maintains instructions and information where the instructions are configured to cause the controller to receive a wireless ping is received from a wireless charger, transmit an interrogation signal configured to stimulate RFID tags through a first radio interface after receiving the wireless ping, refrain from participating in wireless charging when a response to the interrogation signal is received, negotiate a charging configuration when no response to the interrogation signal is received.

The instructions may cause the controller to refrain from responding to the wireless ping when a response to the interrogation signal is received. The instructions may cause the controller to transmit a message configured to terminate charging to the wireless charger in response to the wireless ping when a response to the interrogation signal is received. The instructions may cause the controller to refrain from responding to the wireless ping, or to respond to the wireless ping by transmitting a message configured to terminate charging when a response to the interrogation signal is received, and display a message on a display of the chargeable device, the message indicating presence of an RFID tag when a response to the interrogation signal is received.

Figure 14:
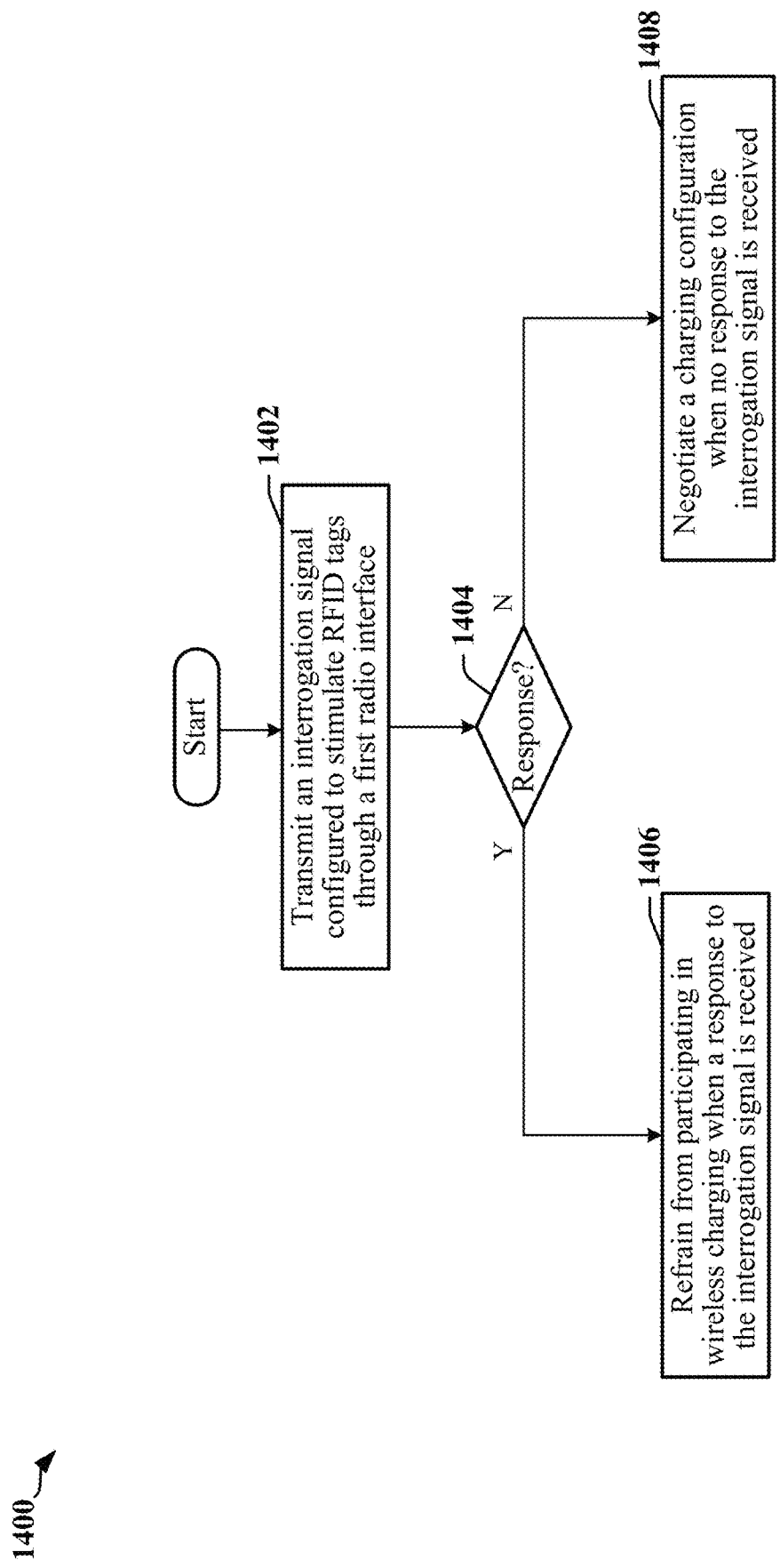
FIG. 14 is a flowchart that illustrates a fourth example of a method for monitoring a charging surface in a wireless charging device in accordance with certain aspects of this disclosure.

FIG. 14 is a flowchart 1400 illustrating a method for wireless charging in accordance with certain aspects of this disclosure. At block 1402, an interrogation signal configured to stimulate RFID tags is transmitted by an RFID interrogating device through a first radio interface. A response is awaited at block 1404. At block 1406, the RFID interrogating device may refrain from participating in wireless charging when a response to the interrogation signal is received. At block 1408, the RFID interrogating device may negotiate a charging configuration when no response to the interrogation signal is received.

In certain implementations, a wireless charger operates as the interrogating device and the first radio interface is provided in the wireless charger. The interrogation signal may be transmitted when a chargeable device is initially placed on or near a surface of the wireless charger. In some examples, the interrogation signal may be transmitted through an antenna comprising one or more coils of the wireless charger. The one or more coils may be configured to receive a charging current when the wireless charger is charging the chargeable device. The one or more coils may be selected based on location of the chargeable device relative to the surface of the wireless charger. The charging current may be configured in accordance with the charging configuration when a response signal to the interrogation signal is not received.

In certain examples, the interrogation signal may be transmitted through an antenna that is configured as a loop surrounding one or more coils of the wireless charger. The one or more coils may be configured to receive a charging current when the wireless charger is charging the chargeable device. In one example, the first radio interface is one of a plurality of radio interfaces provided in the wireless charger. Each radio interface in the plurality of radio interfaces may be coupled to an associated antenna such that different portions of the surface of the wireless charger are surrounded by different antennas. The one or more coils may be based on location of the chargeable device relative to the surface of the wireless charger.

In one example, the wireless charger may negotiate the charging configuration when the response to the interrogation signal is received from an RFID tag previously determined to be associated with a different device. The one or more coils surrounded by the loop of the antenna may be selected based on locations of the chargeable device and the different device relative to the surface of the wireless charger.

In certain implementations, a chargeable device operates as the interrogating device and the first radio interface is provided in the chargeable device. The interrogation signal may be transmitted when a wireless ping is received from a wireless charger. The chargeable device may refrain from responding to the wireless ping when a response to the interrogation signal is received. The chargeable device may transmit a message configured to terminate charging to the wireless charger in response to the wireless ping when a response to the interrogation signal is received. The chargeable device may refrain from responding to the wireless ping when a response to the interrogation signal is received. The chargeable device may respond to the wireless ping by transmitting a message configured to terminate charging when a response to the interrogation signal is received. The chargeable device may display a message on a display of the chargeable device. The message may indicate presence of an RFID tag when a response to the interrogation signal is received.

Some implementation examples are described in the following numbered clauses:

1. A method for wireless charging, comprising: transmitting an interrogation signal configured to stimulate RFID tags or NFC tags through a first radio interface; refraining from participating in wireless charging when a response to the interrogation signal is received; and negotiating a charging configuration when no response to the interrogation signal is received.
2. The method as described in clause 1, wherein the first radio interface is provided in a wireless charger and wherein the interrogation signal is transmitted when a chargeable device is initially placed on or near a surface of the wireless charger.
3. The method as described in clause 2, further comprising: transmitting the interrogation signal through an antenna comprising one or more coils of the wireless charger, wherein the one or more coils are configured to receive a charging current when the wireless charger is charging the chargeable device.
4. The method as described in clause 3, further comprising: selecting the one or more coils based on location of the chargeable device relative to the surface of the wireless charger.
5. The method as described in clause 3 or clause 4, further comprising: configuring the charging current in accordance with the charging configuration when a response signal to the interrogation signal is not received.
6. The method as described in clause 2, further comprising: transmitting the interrogation signal through an antenna that is configured as a loop surrounding one or more coils of the wireless charger, wherein the one or more coils are configured to receive a charging current when the wireless charger is charging the chargeable device.
7. The method as described in clause 6, wherein the first radio interface is one of a plurality of radio interfaces provided in the wireless charger, and wherein each radio interface in the plurality of radio interfaces is coupled to an associated antenna such that different portions of the surface of the wireless charger are surrounded by different antennas.
8. The method as described in clause 6 or clause 7, further comprising: selecting the one or more coils based on location of the chargeable device relative to the surface of the wireless charger.
9. The method as described in any of clauses 6-8, further comprising: negotiating the charging configuration when the response to the interrogation signal is received from an RFID tag previously determined to be associated with a different device; and selecting the one or more coils based on locations of the chargeable device and the different device relative to the surface of the wireless charger.
10. The method as described in any of clauses 1-9, wherein the first radio interface is provided in a chargeable device, wherein the interrogation signal is transmitted when a wireless ping is received from a wireless charger.
11. The method as described in clause 10, further comprising: refraining from responding to the wireless ping when a response to the interrogation signal is received.
12. The method as described in clause 10 or clause 11, further comprising: transmitting a message configured to terminate charging to the wireless charger in response to the wireless ping when a response to the interrogation signal is received.
13. The method as described in any of clauses 10-12, further comprising: refraining from responding to the wireless ping, or responding to the wireless ping by transmitting a message configured to terminate charging when a response to the interrogation signal is received; and displaying a message on a display of the chargeable device, the message indicating presence of an RFID tag when a response to the interrogation signal is received.
14. A wireless charging device, comprising: a plurality of transmitting coils; a driver circuit configured to provide a charging current to the plurality of transmitting coils; a radio interface configured for transmitting and receiving RFID or NFC signals; and a controller configured to: transmit an interrogation signal configured to stimulate RFID tags or NFC tags through the radio interface when a chargeable device is initially placed on or near a surface of the wireless charging device; refrain from initiating wireless charging of a chargeable device when a response to the interrogation signal is received; and negotiate a charging configuration when a response to the interrogation signal is not received.

15. The wireless charging device as described in clause 14, further comprising: an antenna circuit comprising one or more coils in the plurality of transmitting coils, wherein the one or more coils are configured to receive the charging current when the wireless charging device is charging the chargeable device, and wherein the controller is configured to: configure the antenna circuit to include the one or more coils based on location of the chargeable device relative to the surface of the wireless charging device.

16. The wireless charging device as described in clause 14, further comprising: an antenna circuit comprising a loop surrounding one or more coils of the wireless charging device, wherein the one or more coils are configured to receive the charging current when the wireless charging device is charging the chargeable device, and wherein the controller is configured to: select the one or more coils based on location of the chargeable device relative to the surface of the wireless charging device.

17. A processor-readable storage medium having instructions stored thereon which, when executed by at least one processor of a processing circuit, cause the processing circuit to: receive a wireless ping is received from a wireless charger; transmit an interrogation signal configured to stimulate RFID tags or NFC tags through a first radio interface after receiving the wireless ping; refrain from participating in wireless charging when a response to the interrogation signal is received; and negotiate a charging configuration when no response to the interrogation signal is received.

18. The processor-readable storage medium as described in clause 17, wherein the instructions further cause the processing circuit to: refrain from responding to the wireless ping when a response to the interrogation signal is received.

19. The processor-readable storage medium as described in clause 17, wherein the instructions further cause the processing circuit to: transmit a message configured to terminate charging to the wireless charger in response to the wireless ping when a response to the interrogation signal is received.

20. The processor-readable storage medium as described in any of clauses 17-19, wherein the instructions further cause the processing circuit to: refrain from responding to the wireless ping, or to respond to the wireless ping by transmitting a message configured to terminate charging when a response to the interrogation signal is received; and display a message on a display of the chargeable device, the message indicating presence of an RFID tag when a response to the interrogation signal is received.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless charging, comprising:
transmitting an interrogation signal configured to stimulate radio frequency identification (RFID) tags through a first radio interface that is provided in a wireless charger;
refraining from participating in wireless charging when a response to the interrogation signal is received; and
negotiating a charging configuration when no response to the interrogation signal is received, wherein the interrogation signal is transmitted when a chargeable device is initially placed on or near a surface of the wireless charger;
wherein the interrogation signal is transmitted through an antenna that is configured as a loop surrounding one or more coils of the wireless charger, and
wherein the one or more coils are configured to receive a charging current when the wireless charger is charging the chargeable device.

2. The method of claim 1, further comprising:
transmitting the interrogation signal through the antenna comprising one or more coils of the wireless charger, wherein the one or more coils are configured to receive a charging current when the wireless charger is charging the chargeable device.

3. The method of claim 2, further comprising:
selecting the one or more coils based on location of the chargeable device relative to the surface of the wireless charger.

4. The method of claim 2, further comprising:
configuring the charging current in accordance with the charging configuration when a response signal to the interrogation signal is not received.

5. The method of claim 1, wherein the first radio interface is one of a plurality of radio interfaces provided in the wireless charger, and wherein each radio interface in the plurality of radio interfaces is coupled to an associated antenna such that different portions of the surface of the wireless charger are surrounded by different antennas.

6. The method of claim 1, further comprising:
selecting the one or more coils based on location of the chargeable device relative to the surface of the wireless charger.

7. The method of claim 1, further comprising:
negotiating the charging configuration when the response to the interrogation signal is received from an RFID tag previously determined to be associated with a different device; and
selecting the one or more coils based on locations of the chargeable device and the different device relative to the surface of the wireless charger.

8. The method of claim 1, wherein the first radio interface is provided in a chargeable device, wherein the interrogation signal is transmitted after a wireless ping is received from the wireless charger.

9. The method of claim 8, further comprising:
refraining from responding to the wireless ping when the response to the interrogation signal is received.

10. The method of claim 8, further comprising:
transmitting a message configured to terminate charging to the wireless charger in response to the wireless ping when the response to the interrogation signal is received.

11. The method of claim 8, further comprising:
displaying a message on a display of the chargeable device, the message indicating presence of an RFID tag when the response to the interrogation signal is received.

12. A wireless charging device, comprising:
a plurality of transmitting coils;
a driver circuit configured to provide a charging current to the plurality of transmitting coils;
a radio interface configured for transmitting and receiving radio frequency identification (RFID) signals;
a controller configured to:
  transmit an interrogation signal configured to stimulate RFID tags through the radio interface when a chargeable device is initially placed on or near a surface of the wireless charging device;
  refrain from initiating wireless charging of a chargeable device when a response to the interrogation signal is received; and
  negotiate a charging configuration when a response to the interrogation signal is not received; and
an antenna circuit comprising a loop surrounding one or more coils of the wireless charging device, wherein the one or more coils are configured to receive the charging current when the wireless charging device is charging the chargeable device, and
wherein the controller is further configured to:
  select the one or more coils based on location of the chargeable device relative to a surface of the wireless charging device.

13. The wireless charging device of claim 12, further comprising:
an antenna circuit comprising one or more coils in the plurality of transmitting coils, wherein the one or more coils are configured to receive the charging current when the wireless charging device is charging the chargeable device,
and wherein the controller is configured to:
  configure the antenna circuit to include the one or more coils based on location of the chargeable device relative to the surface of the wireless charging device.

* * * * *